(12) United States Patent
Bacci et al.

(10) Patent No.: US 11,426,893 B2
(45) Date of Patent: Aug. 30, 2022

(54) MACHINING CENTER

(71) Applicant: Paolino Bacci S.R.L., Cascina (IT)

(72) Inventors: Giuseppe Bacci, Pontedera (IT); Paolo Bacci, Pontedera (IT); Nino Bacci, Pontedera (IT)

(73) Assignee: PAOLINO BACCI S.R.L., Cascina (IT)

( * ) Notice: Subject to any disclaimer, the term of this patent is extended or adjusted under 35 U.S.C. 154(b) by 845 days.

(21) Appl. No.: 15/648,809

(22) Filed: Jul. 13, 2017

(65) Prior Publication Data

US 2018/0015633 A1    Jan. 18, 2018

(51) Int. Cl.
*B27C 9/00*    (2006.01)
*B23Q 39/02*    (2006.01)
*B23Q 39/04*    (2006.01)

(52) U.S. Cl.
CPC .............. *B27C 9/00* (2013.01); *B23Q 39/024* (2013.01); *B23Q 39/029* (2013.01);
(Continued)

(58) Field of Classification Search
CPC . Y10T 409/307168; Y10T 409/307728; Y10T 409/307784; Y10T 409/308288; Y10T 409/308344; Y10T 409/308568; Y10T 29/5124; B23Q 39/024; B23Q 39/028; B23Q 39/029; B23Q 39/04; B23Q 39/046; B27C 9/00
(Continued)

(56) References Cited

U.S. PATENT DOCUMENTS 5,205,805 A * 4/1993 Otani ................. B23Q 3/15546
483/8
5,265,986 A * 11/1993 Prokopp ............... B23B 39/161
408/16
(Continued)

FOREIGN PATENT DOCUMENTS

EP     0864397 A2 *  9/1998  ............. B23B 39/16
EP     1413409 A2 *  4/2004  ............. B23Q 1/012
(Continued)

*Primary Examiner* — Boyer D Ashley
*Assistant Examiner* — Michael Vitale
(74) *Attorney, Agent, or Firm* — McGlew and Tuttle, P.C.

(57) ABSTRACT

A machining center, comprising:
a number N of workpiece tables equal to or greater than three,
a number N of first guides, which extend parallel to a first direction; along said first guides being movable respective to workpiece tables, one for each first guide,
a number N−1 of second guides, which extend parallel to a second direction transverse to said first direction,
a number N−1 of machining groups each comprising at least one machining head; each machining group being movable parallel to said second direction along a respective second guide;
a number N×(N−1) of machining areas wherein the machining groups can operate on workpieces present on said tables; along each first guide, or for a respective table, there being present N−1 machining areas, one for each machining group, so that each machining group can operate, according to a programmed work cycle, on all said N workpiece tables,
a number N of workpiece loading/unloading areas, one for each workpiece table.

20 Claims, 12 Drawing Sheets

(52) U.S. Cl.
CPC ... *B23Q 39/046* (2013.01); *Y10T 409/307728* (2015.01); *Y10T 409/307784* (2015.01); *Y10T 409/308288* (2015.01); *Y10T 409/308344* (2015.01)

(58) Field of Classification Search
USPC .............. 409/192, 202, 203, 212, 213, 217; 29/563
See application file for complete search history.

(56) References Cited

U.S. PATENT DOCUMENTS

| | | | | |
|---|---|---|---|---|
| 5,429,461 | A * | 7/1995 | Mukherjee | B23Q 1/012 269/60 |
| 6,098,274 | A * | 8/2000 | Raiteri | B23Q 1/601 29/739 |
| 2001/0019686 | A1 * | 9/2001 | Nagasawa | B23Q 1/601 408/43 |
| 2010/0054887 | A1 | 3/2010 | Chen | |
| 2013/0331244 | A1 * | 12/2013 | Onsrud | B23Q 3/15786 483/1 |
| 2014/0227056 | A1 * | 8/2014 | Kosmowski | B23B 47/00 408/129 |
| 2015/0078847 | A1 * | 3/2015 | Hanks | B23C 1/08 408/1 R |

FOREIGN PATENT DOCUMENTS

| | | |
|---|---|---|
| EP | 2 145 744 A1 | 1/2010 |
| WO | 03/097295 A1 | 11/2003 |
| WO | 2014/177997 A1 | 11/2014 |

\* cited by examiner

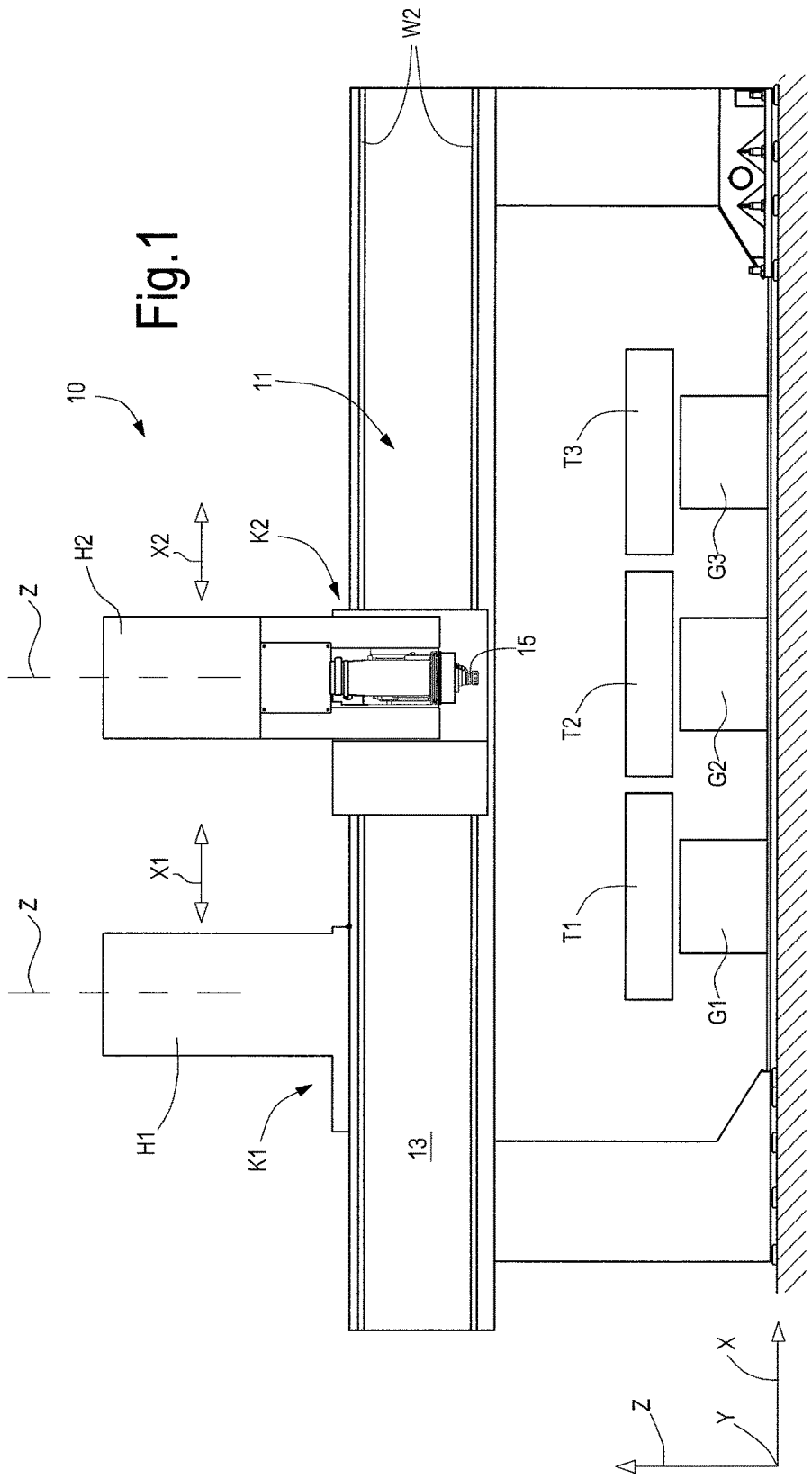

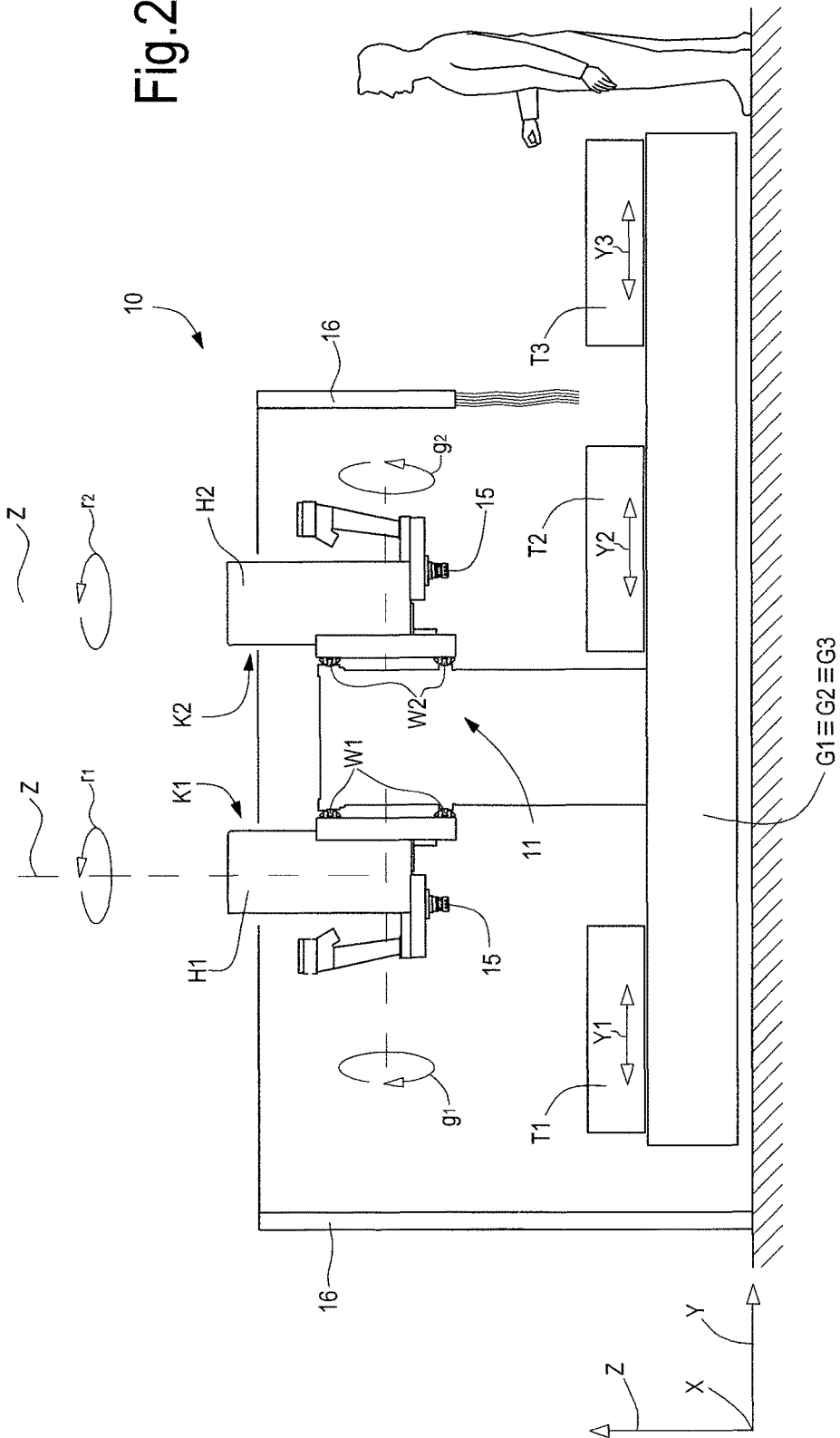

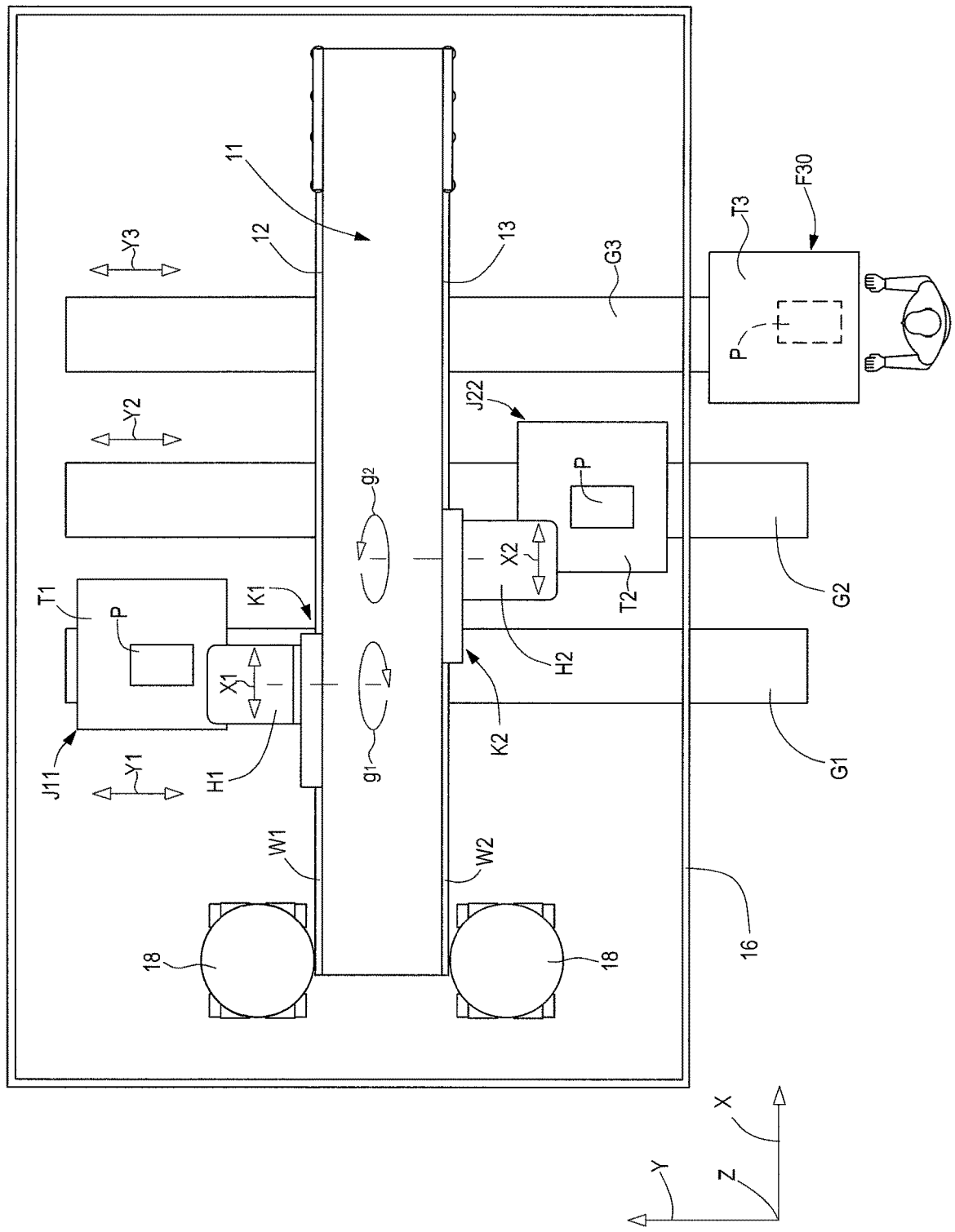

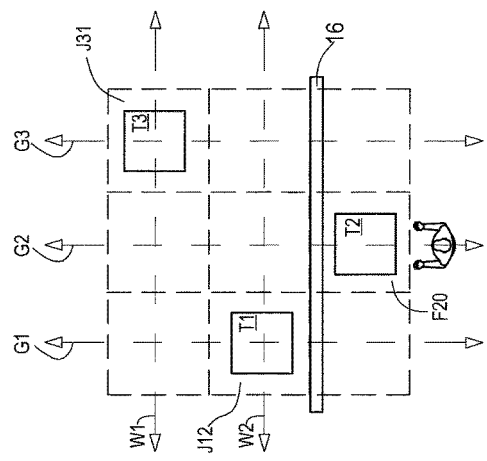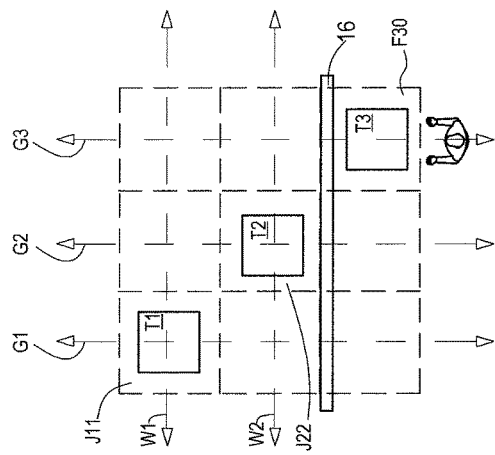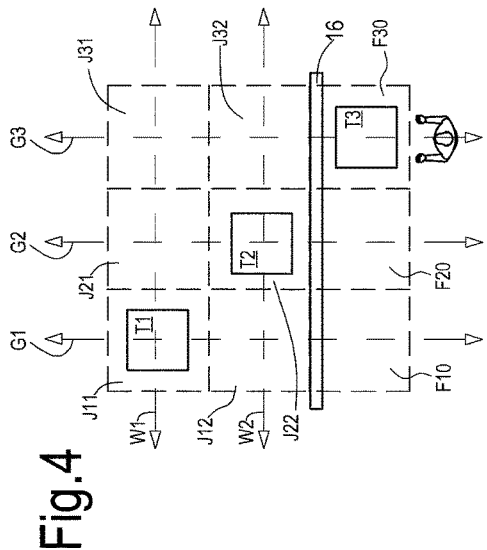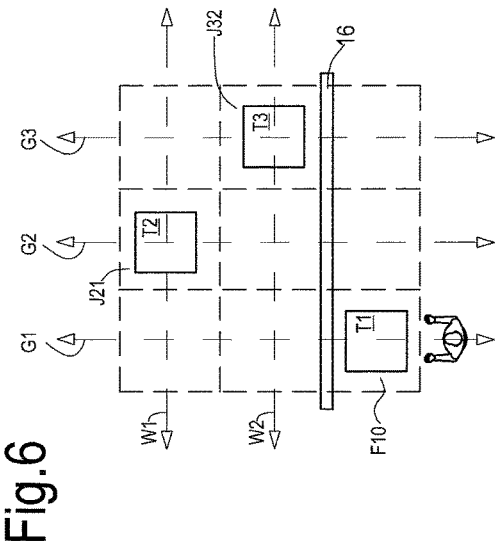

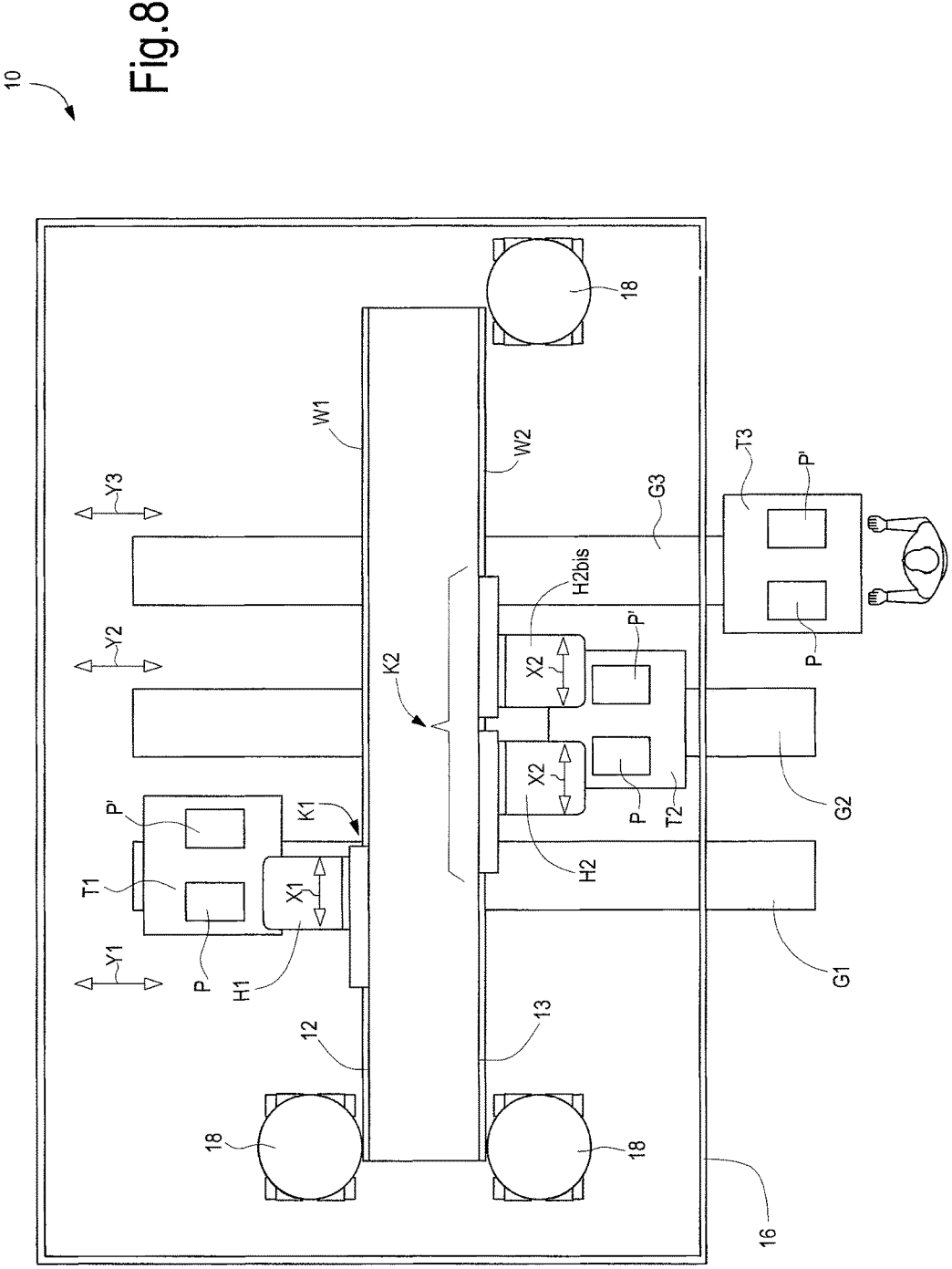

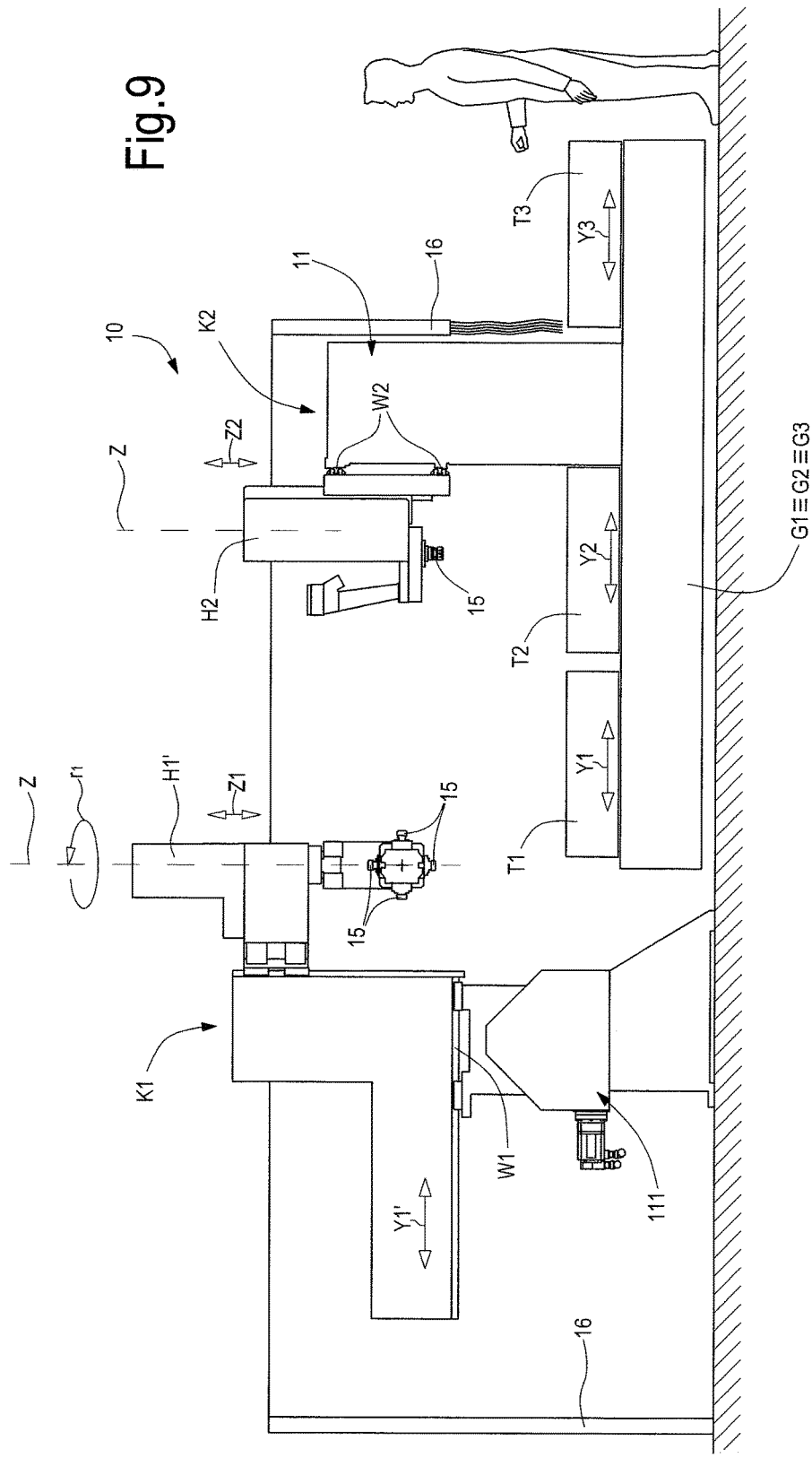

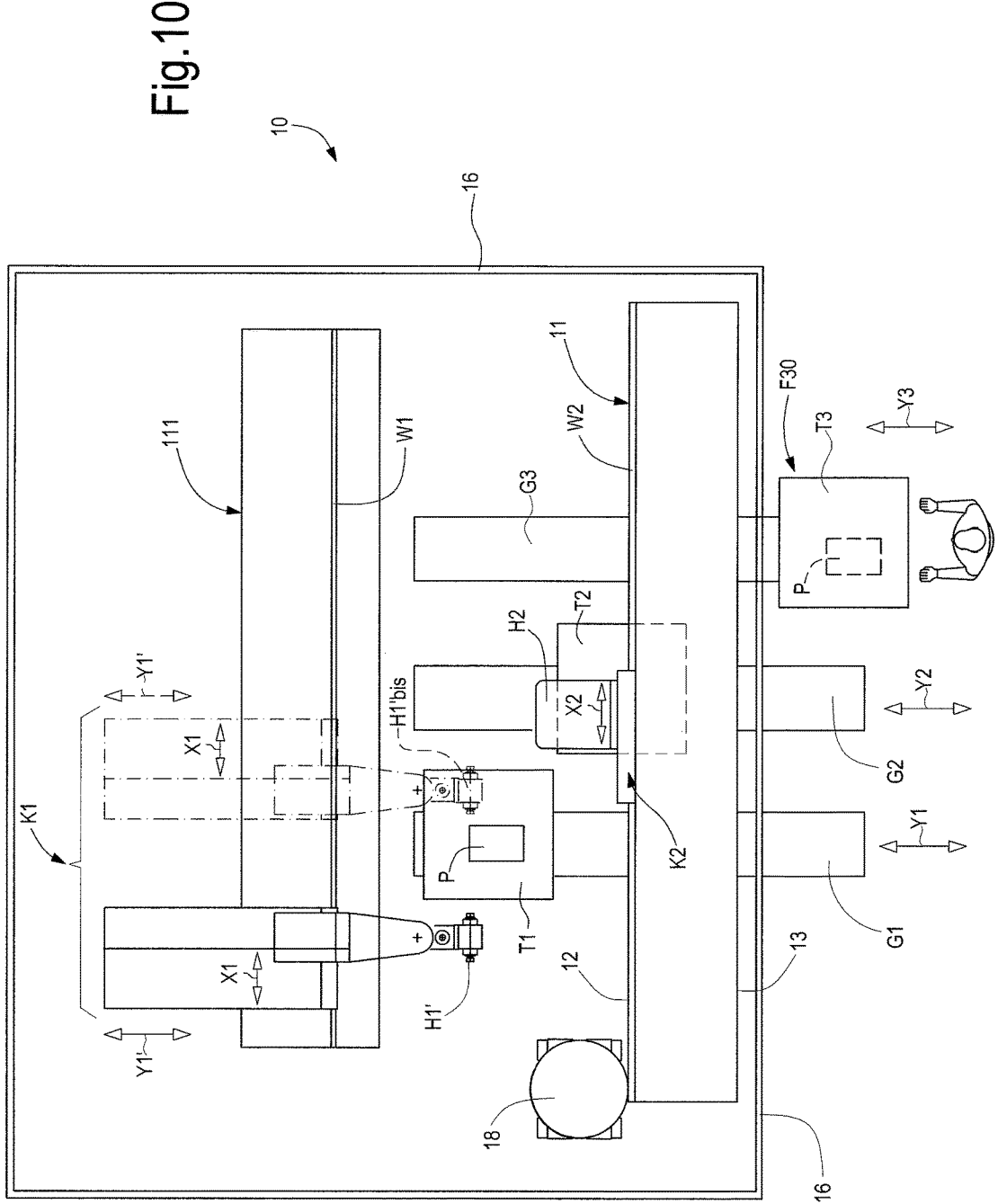

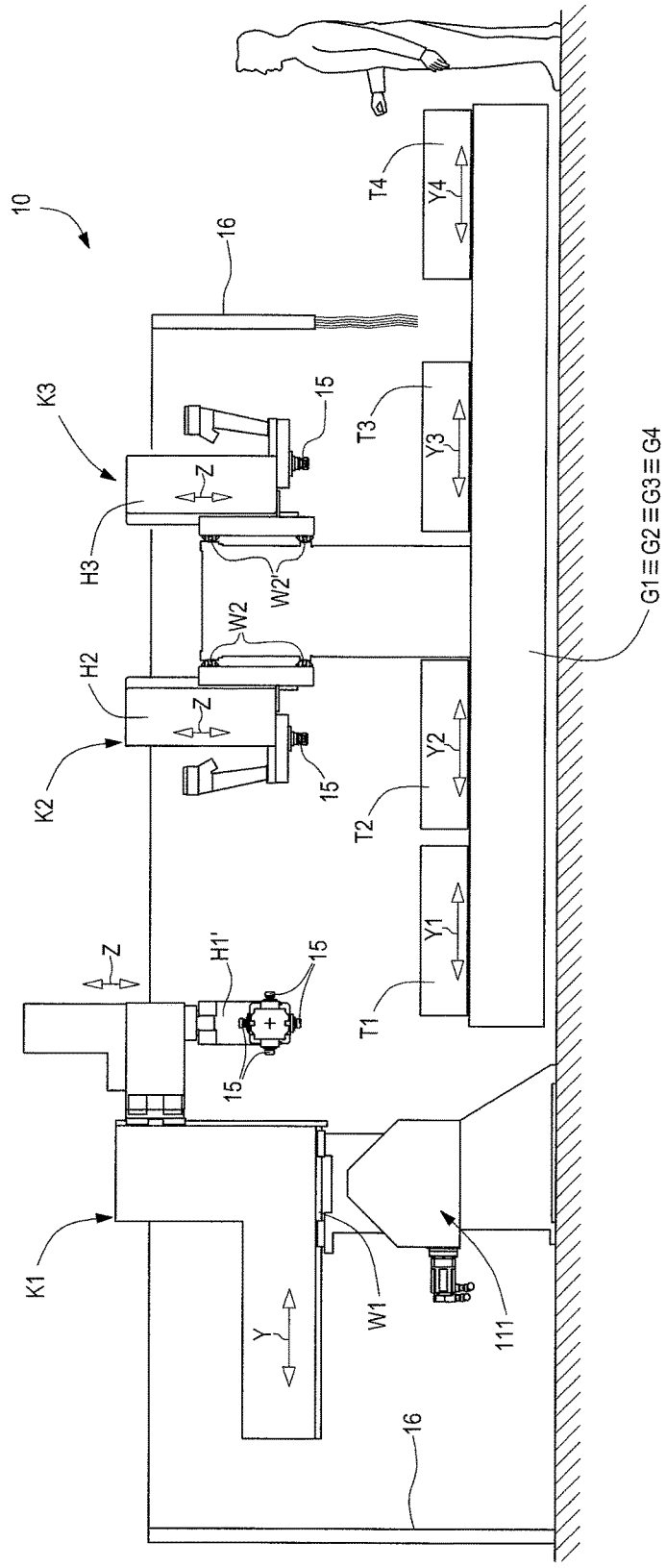

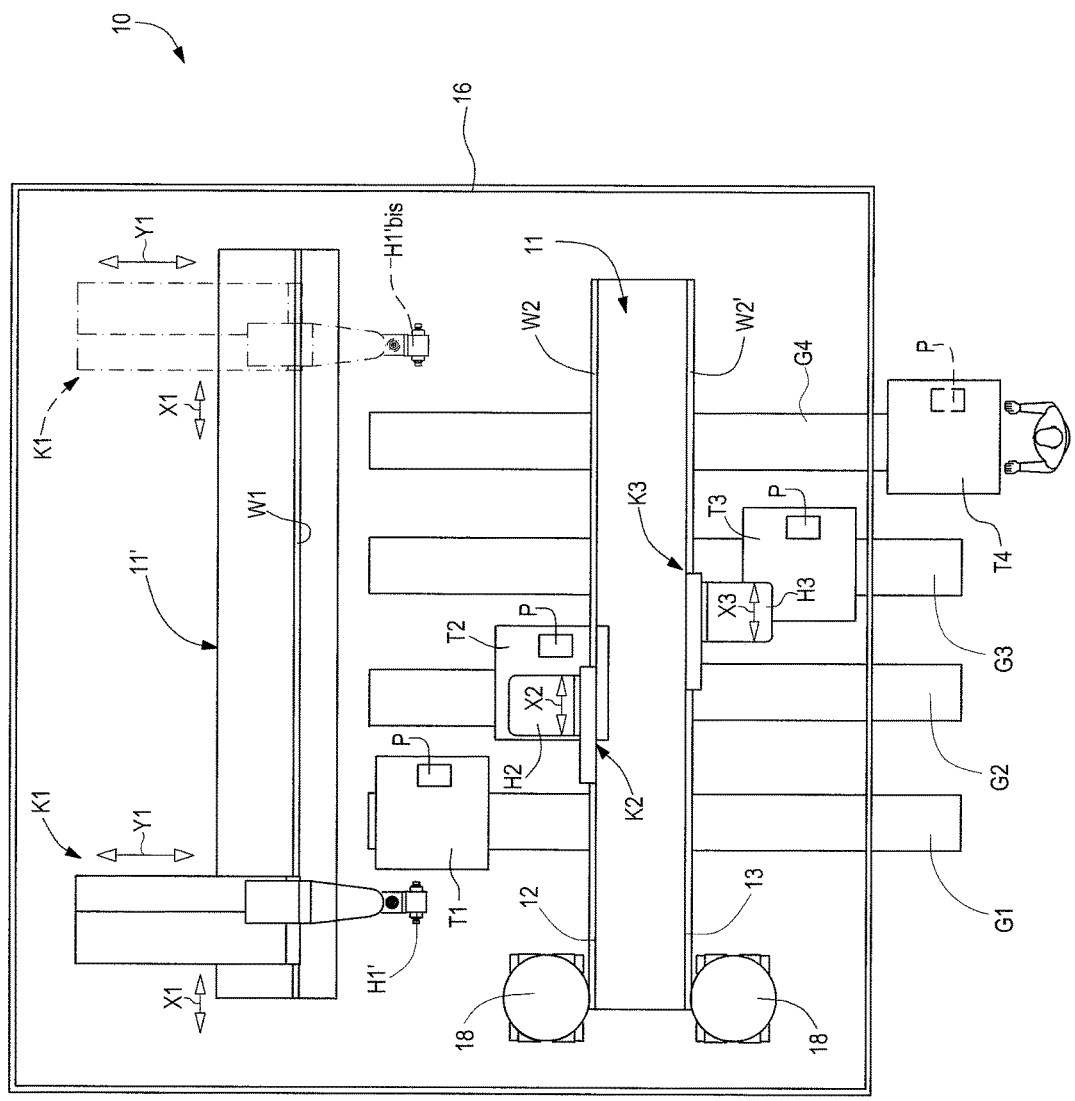

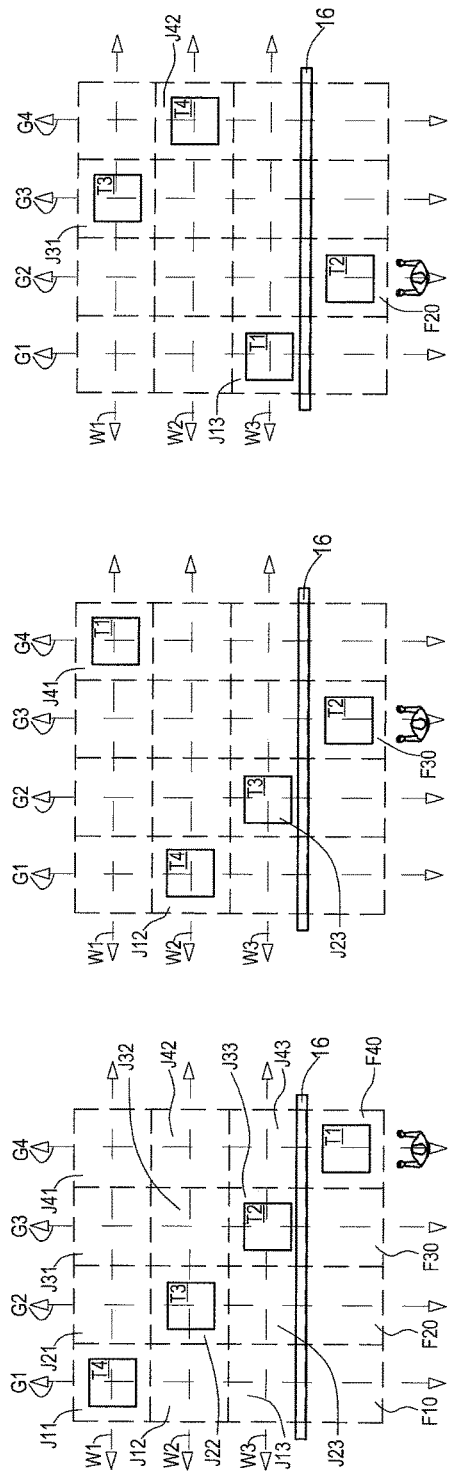

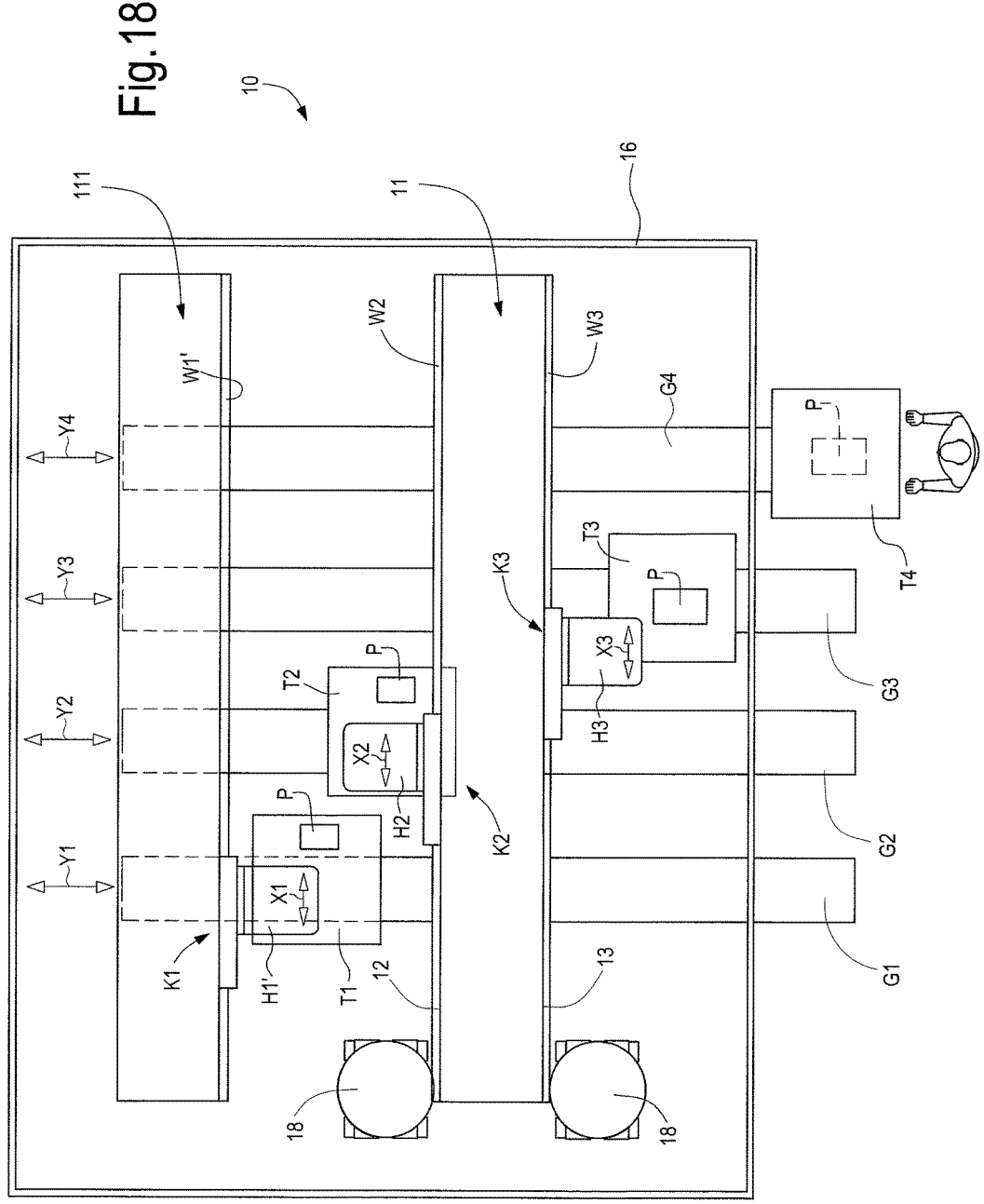

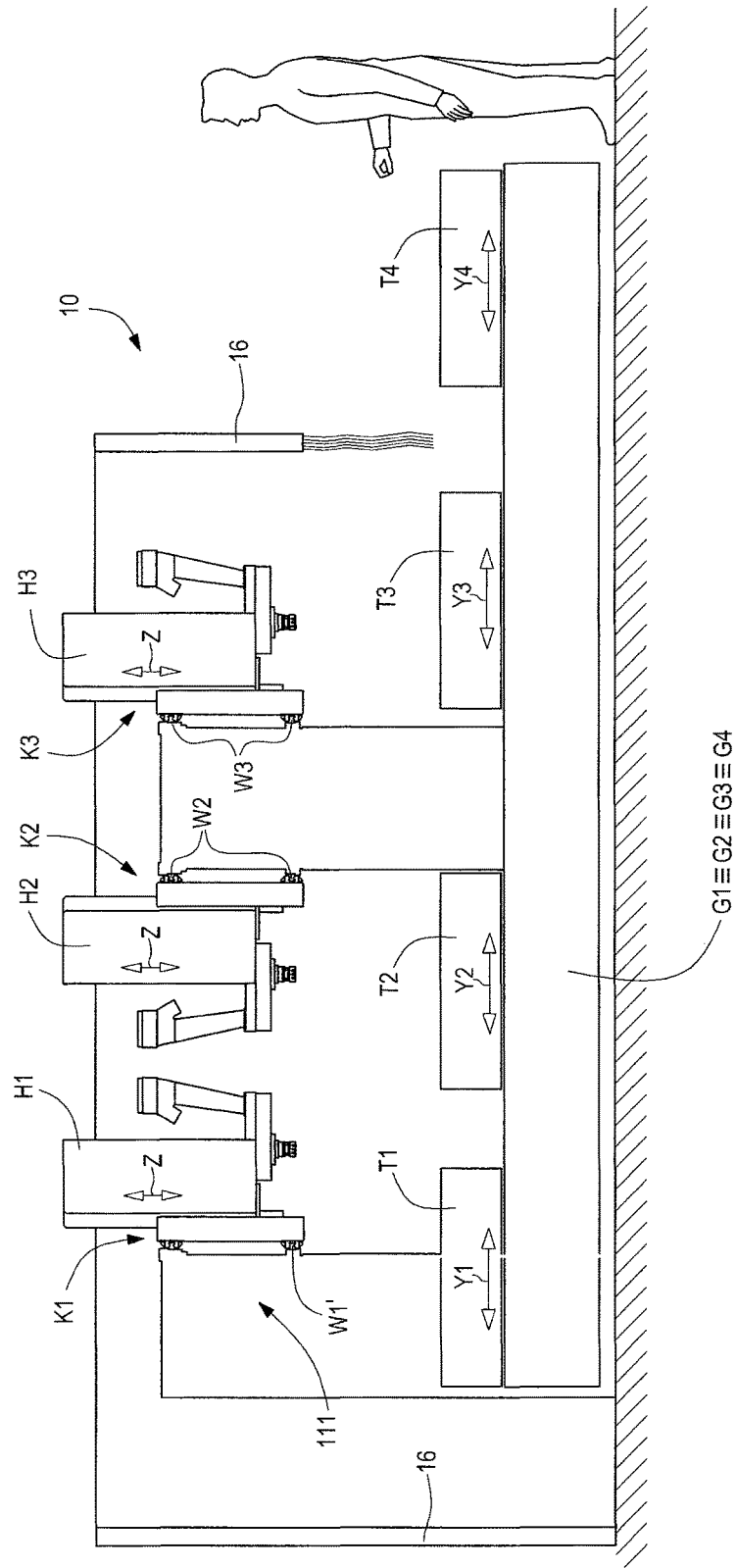

MACHINING CENTER

TECHNICAL FIELD

This invention relates to the field of numerically controlled machining centers, particularly but not exclusively in the wood machining sector. More particularly, object of the invention is a numerically controlled machining center, with 3 or more machining axes, and also a machining method associated with numerically controlled machining centers, particularly but not exclusively for machining wooden workpieces.

STATE OF THE ART

As is well known, for machining wooden workpieces for many years there have been used numerically 3 or more axes control centers. Among the multitude of well-known machining center types are known for example machining centers which comprise two workpiece tables movable parallel among each other on respective guides.

Transversally to these guides there is a portal structure on both sides of which, front and rear, are arranged with respective machining heads equipped with one or more tool-holder spindles. The machining heads can move, for example, according to two axes, that is to say a vertical axis z and a horizontal axis x orthogonal to axis y of the table movement along the respective guide; therefore, by combining the table e and the head movements, machining on the workpiece on the table can be made according to three axes. Obviously, it is also possible that the machining heads are equipped with rotational movements, for example a rotation about axis z and a rotation about axis x, obtaining machining according to 5 axes.

From an operational point of view, the two heads perform, for example, two different machining pieces on the two tables. For example, a piece is loaded on a table and another piece is loaded on the other table. The first table is moved under a first head for a first machining, while the second table is moved under the second head for a second machining. Therefore, each table is moved to a different position along its guide to be able to perform the machining with the other head (which therefore moves towards the new table) to perform the missing machining. The tables then return to the loading/unloading position of the workpieces, where the machined workpiece is unloaded and a new piece is loaded.

The same machining center can be performed in double mode, that is to say four tables, four guides and four machining heads on a longer portal structure, with two heads per side, with the same operation described above (practically, it is as if two machining centers were placed alongside, as described above).

This type of machining center, although known and appreciated for many years, has limitations.

In fact, it is evident that during the loading/unloading step of a table, at least one machining head does not operate, missing its table with the workpiece.

In addition, this machining center, although it can be replicated on a larger scale, for example by doubling the number of tables and heads, is not particularly efficient in terms of head weight balancing, especially in the case of many tool changes.

PURPOSE AND SUMMARY OF THE INVENTION

Object of this invention is to solve the problems and improve the limitations in machining centers, particularly but not exclusively for machining wooden workpieces, of the known type.

Within this object, an important purpose of this invention is to provide a machining center that allows optimizing production times by reducing downtimes as much as possible.

Another important object of this invention is to provide a machining center that allows increasing production.

Last but not least, purpose of this invention is to provide a method of making mechanical machining on numerical controlled machining centers, particularly but not exclusively, for machining wooden workpieces that allows increasing production.

This object, these purposes and others, which will be clearer further down, are reached with a machining center that comprises:
- a number N of workpiece tables equal to or greater than three,
- a number N of first guides, which extend parallel to a first direction; each table being movable along a respective of said first guides,
- a number N−1 of second guides, which extend parallel to a second direction transverse to said first direction,
- a number N−1 of machining groups each comprising at least one machining head; each machining group being movable parallel to said second direction along a respective of said second guides;
- a number N×(N−1) of machining areas in which the machining groups can machine the workpieces present on said tables; along each first guide, or for a respective table, there being present N−1 machining areas, one for each machining group, so that each machining group can operate, according to a programmed work cycle, on all said N workpiece tables,
- a number N of workpiece loading/unloading areas, one for each workpiece table.

Practically, the machining center can be taken as a "matrix" structure in which the first guides represent the matrix columns and the second guides represent the matrix lines and in which the tables translate on the first guides and the machining groups translate on the second guides and in which each machining group does not operate on multiple tables simultaneously, but always operates on one table at a time. In doing so, being present one table more with respect to the machining groups, there is the possibility of scheduling machining center operating cycles so that a table is in the unloading and loading step of the piece(s) to be machined while on the others machining take place by machining groups. Practically, the unloading and loading of the workpieces takes place at a "masked" time while machining on the other tables takes place at full benefit of the machining center productivity and the timing of machining.

In fact, suitably, the center comprises an electronic control group, on which there is preferably a cycle travel program of said tables which comprise, for each table:
a) positioning in said unloading/loading area, for each unloading/loading at least one workpiece on said table,
b) the translation from said unloading/loading area towards a said machining area along a corresponding first guide and positioning in said machining area in which programmed machining can be made from a given machining group,
c) translating towards another operations area along the corresponding first guide and positioning in said other machining area in which machining operations from another given machining group can be made,
d) if there is a further machining area distinct from the previous machining areas on which the table has already been positioned, the translation towards said further machining area and the positioning in said further machining area in which the programmed machining from a further machining group; this step d) being repeated iteratively until there are no longer any machining areas where the table was not positioned during the cycle, e) translation towards said loading/unloading area to resume the cycle from step a).

Preferably, positioning of said tables on said machining areas being coordinated so that two tables never occupy two machining areas on which the same machining group can operate.

Preferably, workpieces from the machining renter may be of the elongated type, that is to say in which a longitudinal dimension prevails over the other two, or even develop predominantly in two dimensions, such as, for example, window and door frames. It is to be understood that even other types of workpieres of the most varied shape can be loaded and machined on the machining center tables according to the invention.

According to preferred embodiments, the machining center comprises at least a portal structure arranged transversely with respect to the first guides; on at least one side of the portal structure is movable in parallel to said second direction, on a respective second guide, a said machining group. Preferably, the portal structure is superimposed on an intermediate position of the first guides, so that the tables are movable on the first guides under the portal structure, by passing from one side to the other of said portal structure; possibly said tables being able to position themselves at least partially under said portal structure.

Preferably, on each side of the portal structure is movable in parallel to the second direction, a respective machining group; on each side is arranged a respective of said second guides. Alternatively, to such portal structure is associated a single machining group arranged on said second guide and provided on a single side of said structure.

The machining heads have numerically controlled machining axes. The movement of the tables is numerically controlled.

According to preferred embodiments, at least one machining head of at least one of said machining groups of the portal structure is of the type:

with two machining axes, with a first vertical translation axis and a second horizontal translation axis corresponding to the axis of the second guide on which it is movable, so that, in combination with the axes corresponding to the movement of the tables along the respective first guides, said machining center is at least at 3 machining axes; or with four machining axes, with a first vertical translation axis and a second horizontal translation axis corresponding to the axis of the second guide on which it is movable, a third rotation axis (preferably horizontal parallel to said first direction) and a fourth rotation axis, (preferably in rotation on a vertical plane about said second axis) so that, in combination with the axes corresponding to the movement of the tables along the respective first guides, said machining center is at least at 5 machining axes.

According to preferred embodiments, at least one of said machining groups comprises a single machining head.

According to preferred embodiments, at least one of said machining groups comprises two machining heads, movable independently of one another in parallel to said second direction.

According to preferred embodiments, the N loading/unloading areas of the workpieces are provided in the first end areas of said first guides. Preferably, the center comprises also a bearing structure provided in the second end areas of said first guides, on the opposite side with respect to said first end areas; on said bearing structure is provided at least one said second guide for a respective machining group; preferably this bearing structure is:

a) a portal structure that is positioned over the second end areas of said first guides, or b) said load bearing structure facing said second ends of said first guides, without being positioned over them; preferably the machining group movable on said load bearing structure comprising at least one machining head with at least three axes, a first vertical translation axis and a second horizontal translation axis corresponding to the axis of the second guide on which it is movable, and a third translation axis parallel to said first direction, another two rotation axes being optionally possible.

According to another aspect, the invention relates also to a method for making mechanical machining by means of a machining center according to one or more of the abovementioned embodiments or configurations, or combinations thereof.

According to this aspect, the invention relates also to a method for making mechanical machining by means of a machining center comprising:

a number N of workpiece tables equal to or greater than 3, each translatable parallel to a first direction, a number N−1 of machining groups each comprising at least one machining head; each machining group being translatable parallel to a second direction;

a number N×(N−1) of machining areas in which the machining groups can machine workpieces present on said tables;

a number N of loading/unloading areas of the workpieces, one for each workpiece table, said method providing, for each table, the following steps:

a) positioning in said unloading/loading area, to load at least one workpiece onto said table, b) translation from said unloading/loading area towards a said machining area and positioning in said machining area in which programmed machining operations can be carried out by a given machining group, c) translation towards another machining area along the corresponding first guide and positioning in said other machining area in which programmed machining operations can be carried out by another given machining group, d) if a further machining area is present, distinct from the preceding machining areas on which the table has already been positioned, translation towards said further machining area and positioning in said further machining area in which programmed machining operations can be carried out by a further given machining group; this step d) being repeated iteratively until there are no more machining areas in which the table has not been positioned during the cycle, e) translation towards said loading/unloading area to unload the at least one machined workpiece and restart the cycle from step a).

Preferably, positioning of said tables on said machining areas being coordinated so that two tables never occupy two machining areas on which the same machining group can operate.

BRIEF DESCRIPTION OF THE DRAWINGS

Further characteristics and advantages of the invention will be more apparent from the description of some of its preferred embodiments but not exclusive, illustrated by way of non-limiting example, in the accompanying drawings, in which:

FIG. 1 is a schematic side view of a first embodiment of a machining center according to the invention, with the workpiece tables in a first configuration corresponding to step 1 of the machining cycle;

FIG. 2 is a schematic rear view of the machining center of FIG. 1, in the same configuration;

FIG. 3 is a schematic top view of the machining center of FIG. 1, in the same configuration;

FIGS. 4 to 7 represent an arrangement diagram of the workpiece tables in four successive steps relating to a complete machining cycle, relative to a machining center as in the previous Figures;

FIG. 8 is a schematic top view of a second embodiment of a machining center according to the invention, with the workpiece tables in a first configuration;

FIG. 9 is a schematic side view of a third embodiment of a machining center according to the invention, with the workpiece tables in a first configuration corresponding to step 1 of the machining cycle;

FIG. 10 is a schematic top view of the machining center of FIG. 9, in the same configuration;

FIG. 11 is a schematic side view of a fourth embodiment of a machining center according to the invention, with the workpiece tables in a first configuration corresponding to step 1 of the machining cycle;

FIG. 12 is a schematic top view of the machining center of FIG. 11 in the same configuration;

FIGS. 13 to 17 represent an arrangement diagram of workpiece tables in four successive steps relating to a complete machining cycle relating to a machining center as in FIGS. 11 and 12;

FIG. 18 is a schematic side view of a fifth embodiment of a machining center according to the invention, with the workpiece tables in a first configuration corresponding to step 1 of the machining cycle, and the machining steps thereof are similar to those shown in FIGS. 13 to 17;

FIG. 19 is a schematic top view of the machining center of FIG. 18, in the same configuration;

DETAILED DESCRIPTION OF AN EMBODIMENT OF THE INVENTION

With reference to the above cited Figures, a workpiece center for machining wooden workpieces is generally indicated by number 10.

Example 1

Machining center 10 comprises a number N equal to three, of first rectilinear G1, G2 and G3 guides, which extend parallel to a Y horizontal direction. The development directions of each first guide, that is to say the handling directions of the T tables, are indicated respectively by y1, y2 and y3.

On these first G1, G2 and G3 guides (hereinafter, when referring to all three, or indifferently to one or the other, they will also be indicated simply with G), are assembled respective T1, T2 and T3 workpiece tables, one for each guide (hereinafter, when referring to all three, or indifferently to one or the other, they will also be indicated simply with T).

Each table can carry one or more P pieces (only shown in the top views, that is to say, in Figures from 3 to 7).

Preferably, such P pieces can be of the elongated type, that is to say, in which a longitudinal dimension prevails over the other two, or even develop predominantly in two dimensions, such as for example in window and door frames. It must be understood that even other types of pieces of the most varied shape can be loaded and machined on the machining center tables according to the invention.

The T tables can be translated on the numerically controlled G guides.

A portal type bearing structure is generally indicated by numeral 11. This portal structure 11 is arranged transversally, in an orthogonal mode, to the first G guides. More particularly, this portal structure 11 is arranged in an intermediate position to the 0 guides so that the T tables are movable on the first G guides under the portal structure, being able to pass from the front side 12 to the latter's rear side 13, and vice versa, or positioning itself partially under that portal structure, if necessary.

On two front and rear sides 12 and 13 of the portal structure 11, there are two second guides W1 and W2 (hereinafter, when referring to both, or indifferently to one or the other, they will also be indicated simply with W), one for each side, which develop parallel to a second X direction, horizontal and orthogonal to the first Y direction.

On these second W guides, are arranged two movable machining groups, one for each side, respectively indicated with K1 and K2 (hereinafter, when referring to both, or indifferently to one or the other, they will also be indicated simply with K). Each K machining group can move independently of each other and can move indifferently over either of the first G guides so that they can operate on both T tables. Each K machining group operates only on one table at a time, as it will be clearer further down.

In this example, the K1 and K2 machining groups each include a machining head, respectively indicated by H1 and H2 (hereinafter, when referring to both, or indifferently to one or the other, they will also be indicated simply with H). The development directions of the second W1 and W2 guides, that is to say the translation directions of the K groups or H heads, are indicated with x1 and x2 and are marked, for simplicity's sake, on the H heads. These machining heads can be of one spindle 15 type or more than one spindle, according to known types. Tool holder storages 18 can be present, for example arranged along the portal structure.

The H machining heads can be two or more machining axes. For example, H1 head has a first vertical translational axis z1 and a second axis of horizontal translational corresponding to axis x1 of the second guide W1 on which it moves, so that in combination with the axes y1, y2, y3 corresponding to the movement of T1, T2 and T3 tables along their respective first G1, G2 and G3 guides, the machining center is of the type of at least 3 machining axes. It is also possible to add to H head the other machining axes. For example, the H1 head can have a third rotational axis g1 parallel to the first Y direction and a fourth rotation axis r1 parallel (or coincident) to the vertical translation axis z1, so that, in combination with rotation axis y1 corresponding to the movement of T1 table the machining center 10 is at least at 5 machining axes.

Each H head is movable, independently of the other, on the respective second W guide according to its direction x1 or x2, so that it can operate on both T tables.

By combining the movement of tables T and of the K (or H heads) machining groups, in the machining center 10, 3×2=6 machining areas are defined, in which the K machining groups can operate on the P pieces on T tables; these machining areas are shown from the top in a "matrix" diagram in Figures from 4 to 7 and indicated by letter J and a pair of subsequent numbers where in the first number corresponds to the number relative to the first guide along which moves a table, while the second number corresponds to the number related to the second guide along which a machining group moves (for example, T1 table moves on the first G1 guide and the K2 machining group moves on the second W2 guide, so that the machining area defined by the movement of the K2 machining group and the movement of T1 table is designated J12). These machining areas are practically the spaces occupied by the tables during machining with the groups and do not correspond only to a fixed position of the tables.

More in detail, in this example, along each first guide G, that is, for a respective T table, there are two machining areas, one for each machining group, so that each K machining group (that is, the respective machining H heads) can operate, according to a programmed machining cycle, on both workpiece T tables, preferably in a non-contemporary manner.

In the first end areas of the first G1, G2 and G3 guides, the F10, F20 and F30 loading/unloading areas of the respective T tables are defined (hereinafter, when referring to both, or indifferently to one or the other, they will also be indicated simply with F). The Figures show an operator handling unloading and loading operations, but it is evident that such operations can also be performed by automatic loading/unloading systems, for example of the known type.

Suitably, there is a protection guard 16 surrounding the machining center. The F loading/unloading areas are outside the protection guard 16, in order to allow an operator to handle the loading and unloading operations.

Machining center 10, comprises, as it is obvious, an electronic control unit, not shown in the Figures, suitable for the management of the center thereof. An advantageous program is provided on this center, which manages the T table coordinated movement cycles to make the machining through the K machining groups, which allows optimizing the machining times by reducing downtimes.

From a practical point of view, according to the invention, there is a K machining group number lower by one unit with respect to the number of tables (and corresponding loading/unloading areas), with the same groups that can anyway operate on all tables (a machining group cannot operate simultaneously on multiple tables). Therefore, it is possible to program the machining center so that when a table is at the unloading step, the other two are engaged in operating with distinct machining groups, so that each table is engaged, after the loading of the workpiece, first with one machining group and then with the other machining group, before returning to the unloading position of the just finished machining workpiece.

See the concrete example described below. As previously mentioned, Figures, from 4 to 7, show a "matrix" diagram of the machining center, in which the columns represent practically the first G guides, while two lines represent the W guides on which run the K groups or the machining H heads. The crossings of such lines with the columns represent in practice the J machining areas.

For example, with reference to FIG. 4 (step 1), and referring to a cycle time not corresponding to the machine start-up, T1 table is in machining area J11, or it is interacting with K1 group, or with H1 head to allow P workpiece, loaded thereon, to undergo a first machining; T2 table is in J22 area where it is interacting with K2 group, that is, H2 head, to operate on the respective workpiece a second machining, while T3 table is in the F30 loading/unloading area to unload a just finished machining workpiece and load a P workpiece to be machined.

Subsequently (FIG. 5, step 2), table 1 is moved to J12 machining position to interact with machining H2 head (moved to this position from the previous J22 position) and perform the second machining on the workpiece, while T3 table is moved to J31 position to interact with H1 head and perform the first workpiece machining. Instead, T2 table is moved to F20 loading/unloading position to unload the workpiece that has undergone both machining operations from H1 and H2 heads.

Subsequently (FIG. 6, step 3), T1 table, wherein the machining workpiece has finished being machined, is moved to the F10 loading/unloading position to unload the workpiece and load the new workpiece. T2 table is moved from F20 loading/unloading position to machining J21 position to interact with H1 head and perform the first machining on the respective workpiece. T3 table is moved to J32 machining position to perform the second machining on the workpiece.

Subsequently (FIG. 7, step 4), T1 table, with the new loaded workpiece, is moved to J11 position to perform the first machining on the workpiece in cooperation with H1 head; T2 table is moved to J22 position to perform the second machining on the workpiece in cooperation with H2 head, and T3 table is moved to the loading/unloading position to unload the just finished machining workpiece and reload the new one. This step 4 coincides with the above described step 1, by repeating the machining cycle.

It is clear that the tables moving order in other machining cycles can be different by maintaining the same logic of the invention.

Practically, with the machining center according to the invention, all tables can be neatly machined first by a group and then by the other and it is possible to carry out the loading/unloading steps at a "masked" time during machining.

Example 2

In some cases, for greater productivity, as shown in FIG. 8, a K machining group can comprise two H and Hbis machining heads to allow parallel machining of two equal or specular P products arranged on the same T table.

For example, by considering the double-headed K2 group and P and P' double workpiece, an H2 head can be used to perform fast operations, for example milling, while the H2bis head can perform slower operations, for example smoothing. Thus, the required times for the various steps may result to be particularly balanced.

The machining cycle remains as described above, with the difference that while in the previous example machining K2 group comprised machining by only H2 head, now the same group provides machining consisting of two "parallel" machining operations performed by respective H2 and H2bis heads.

The operation and machining cycles are substantially the same as that described above, and the diagrams in Figures from 4 to 7 apply also in this case.

Example 3

FIGS. 9 and 10 show a further variation of the machining center 10. As in Example 1, there is a bearing structure of the portal type 11 in an intermediate position with respect to the first G guides, and a second bearing structure 111 provided in the second end areas of the first G guides, on the opposite side to the F loading/unloading areas, and facing the ends of said first G guides, without overlapping thereon.

On the portal structure 11, on the front side 12, is provided a said W2 guide, horizontal and orthogonal to the G guides, on which a machining K2group is arranged, bearing a machining H2 head, such as those described above.

On the end bearing structure 111 is provided a first W1 guide, on which is arranged a machining K1 group, which comprises two machining H1' and H1'bis heads (the latter is hatched) of a different type with respect to that described so far. In fact each one of these has, in addition to the machining axes provided for the previous heads a further translation axis y1' parallel to the Y direction, so as to allow machining along this axis when the respective T table with which it interacts has arrived in the end of stroke G guide position, a position wherein the table cannot advance any longer. It is clear that the two H1' and H1'bis heads can operate also individually on a table and not necessarily in pairs (in any case the K1 group operates on one table at a time, whether it uses one of the two heads, or if it uses them both at the same time).

The operation and the machining cycle is substantially the same as that described above, and the diagrams in FIGS. from 4 to 7 apply also in this case.

Example 4

FIGS. 11 to 17 show a further embodiment of the machining center according to the invention, varying from Example 3, described above.

In this new Example, a new first G4 guide was added for a respective T4 table. Consequently, according to the invention, a third machining K3 group was added (the machining K groups are equal to three in number, that is, one less than the tables).

With respect to the previous Example, portal structure 11 has a second W3 guide on the rear side 13 of the structure, and on that guide there is arranged machining K3 group. In this example there is an H3 head movable along W3 in the x3 direction, similar to the H2 heads of Example 1 or Example 3.

The machining cycle is similar to the previous examples. Reference is made to the new "matrix" diagrams shown in Figures from 13 to 17 (diagrams defined as in the previous Examples). For example, with reference to FIG. 13 (step 1), and referring to a cycle time not corresponding to the machine start-up, T1 table is in the machining J11 area, that is, it is interacting with K1 group, or H1' head and/or H1'bis head, to allow P workpiece, loaded thereon, to undergo a first machining; T2 table is in J22 area where it is interacting with K2 group, that is, H2 head to operate on the respective workpiece a second machining; T3 table is in J33 area where it is interacting with K3 group, that is H3 head to operate on the respective workpiece a third machining; T4 table is in the loading/unloading F40 position to unload a just finished machining workpiece and load a P workpiece to be machined.

Subsequently (FIG. 14, step 2), table 1 is moved to machining J12 position to interact with the machining H2 head (moved to this position from the previous J22 position) and perform the second machining on the workpiece; T2 table is moved to J23 position to interact with H3 head to perform the third machining; T4 table is moved to J41 position to interact with H1' and/or H1'bis head and perform the first machining of the workpiece, while T3 table instead is moved into the loading/unloading F30 position to unload the workpiece that has undergone machining from H1' and/or H1'bis, H2 and H3 heads.

Subsequently (FIG. 15, step 3), T2 table, the workpiece thereof having finished machining, is moved to the loading/unloading F20 position to unload the workpiece and load the new workpiece. T3 table is moved from the loading/unloading F30 position to the machining J31 position to interact with H1' and/or H1'bis head and perform the first machining on the respective workpiece, T1 table is moved to J13 position to interact with H3 head to perform the third machining, while T4 table is moved to machining J42 position to interact with machining H2 head and perform the second machining.

Subsequently (FIG. 16, step 4), T1 table, the workpiece thereof having finished machining, is moved to the loading/unloading F10 position, to unload the workpiece and load the new workpiece, T2 table is moved from the loading/unloading F20 position to machining J21 position to interact with H1' and/or H1'bis head and perform the first machining on the respective workpiece, T3 table is moved to machining J32 position to interact with machining H2 head and perform the second machining, while T4 table is moved to J43 position to interact with H3 head to perform the third machining.

Subsequently (FIG. 17, step 5=step 1), the tables are moved to occupy the positions as at step 1 and re-start the cycle.

It is clear that the moving order of the tables in other machining cycles can be different, by maintaining the same logic of the invention.

Practically, with one more table and machining group, the machining steps increase by one step with respect to the previous Examples.

Example 5

This Example (FIGS. 18 and 19) is similar to Example 4, that is, it has four first G guides and three machining K groups. In this Example instead of an end bearing structure 111 such as that described in Examples 3 and 4, in the end areas opposite to the loading/unloading F areas there is an end bearing structure of the portal type 11'. T tables can be positioned under this portal structure 11'.

On the rear side 13' of the portal structure 11' there is a second W1 guide on which is arranged a machining K1 group having an H1 head similar to the heads described in the first Example.

The machining cycle of the machining center of this Example is similar to that of Example 4, described above.

It is clear that the Examples described up to now can be combined among them. The various machining groups can have one, two or more machining heads.

The number of the first G guides and T tables can be more than four. For example, with five tables it may be possible to use two portal structures that overlap the first G guides, with machining groups arranged on both sides of both portal structures.

In the case of six tables, to such a configuration it can be added an end bearing structure 111 such as that described in Examples 3 or 4.

The type of heads (mono or multi-spindle, tool changing, etc.) for each group, the number of machining axes thereof, type, number and position of tool storages, etc., can be significantly varied, depending on the requirements and the state of the art.

It is understood that what has been illustrated is only possible non-limiting embodiments of the invention, which can vary in the shapes and arrangements without departing from the scope at the basis of the invention. Any possible reference numbers in the attached Claims is solely intended to facilitate reading in the light of the above description and the accompanying drawings and does not limit in any way the scope of protection.

The invention claimed is:

1. A machining center, comprising:
   a number N of workpiece tables equal to or greater than three;
   a number N of first guides, which extend parallel to a first direction, each of said number N of workpiece tables being movable along a respective one of said number N of first guides;
   a number N−1 of second guides, which extend parallel to a second direction transverse to said first direction;
   a number N−1 of machining groups, each of said number of N−1 machining groups comprising at least one machining head, each of said number of N−1 machining groups being movable parallel to said second direction along a respective one of said number N−1 of second guides;
   a number N×(N−1) of machining areas in which the number of N−1 of machining groups can machine the workpieces present on said number N of workpiece tables, along each of said number N of first guides, or for a respective table of the number N of workpiece tables, wherein N−1 machining areas are present, one for each of the number N−1 machining groups, so that each of the number N−1 machining groups can operate, according to a programmed work cycle, on all of said number N of workpiece tables;
   a number N of workpiece loading/unloading areas, one for each workpiece table.

2. The machining center according to claim 1, further comprising at least one portal structure arranged transversely to said number N of first guides, one of said number N−1 of machining groups on at least one side of said at least one portal structure being movable parallel to said second direction, on a respective one of said number N−1 second guides.

3. The machining center according to claim 2, wherein said at least one portal structure is placed over an intermediate position of said number N of first guides, so that said number N of workpiece tables are movable on said number N of first guides below said at least one portal structure, passing from one side to another side of said at least one portal structure.

4. The machining center according to claim 2, wherein on said at least one portal structure there are movable in the second direction:
   two of said number N−1 machining groups arranged respectively on each side of said at least one portal structure, on each side there being arranged a respective one of said number N−1 of second guides, or,
   a single one of said N−1 machining groups arranged on a single side of said at least one portal structure.

5. The machining center according to claim 1, wherein said at least one machining head of at least one of said number of N−1 machining groups is of the type:
   with two machining axes, with a first vertical translation axis and a second horizontal translation axis corresponding to an axis of one of the number N−1 of second guides on which it is movable, so that, in combination with the two machining axes corresponding to the movement of the number N of workpiece tables along the respective first guides, said machining center is at least with 3 machining axes; or
   with four machining axes, with the first vertical translation axis and the second horizontal translation axis corresponding to the axis of the one of the number N−1 of second guides on which it is movable, a third rotation axis and a fourth rotation axis, so that, in combination with the four machining axes corresponding to the movement of the number of N workpiece tables along the respective first guides, said machining center is at least with 5 machining axes.

6. The machining center according to claim 1, wherein at least one of said number N−1 of machining groups comprises a single machining head.

7. The machining center according to claim 1, wherein at least one of said machining groups comprises two machining heads, movable independently from one another parallel to said second direction.

8. The machining center according to claim 1, wherein said N of workpiece loading/unloading areas are provided in first end areas of said number N of first guides.

9. The machining center according to claim 8, comprising a load-bearing structure provided in second end areas of said first guides, on the opposite side with respect to said first end areas, on said load-bearing structure there being provided at least one said second guide for a respective machining group; said load-bearing structure being:
   a portal structure that is positioned over the second end areas of said first guides, or
   said load-bearing structure facing said second ends of said first guides, without being positioned over them;
   the machining group movable on said load-bearing structure comprising at least one machining head with at least three axes, a first vertical translation axis and a second horizontal translation axis corresponding to the axis of the second guide on which it is movable, and a third translation axis parallel to said first direction.

10. The machining center according to claim 9, wherein the machining group further comprises two rotation axes.

11. The machining center according to claim 1, comprising an electronic control unit on which there is provided a program for managing a cycle of movements of said number N of workpiece tables which provides for, for each table:
   positioning in the corresponding loading/unloading area, to load at least one workpiece onto said table;
   translation from said corresponding loading/unloading area toward one of said number N×(N−1) of machining areas along the corresponding first guide and positioning in said one of said number N×(N−1) of machining areas in which programmed machining operations can be carried out by one of the number N−1 of machining groups;
   translation toward another machining area along the corresponding first guide and positioning in said another machining area in which programmed machining operations can be carried out by another of the machining groups;
   if a further machining area distinct from the number N×(N−1) of machining areas on which the table is already positioned is present, translation toward said further machining area and positioning in said further machining area in which programmed machining operations can be carried out by a further given machining group; this step d) being repeated iteratively until there are no more machining areas in which the table has not been positioned during the cycle;

translation toward said corresponding loading/unloading area to unload the workpiece and restart the cycle from step a) on a subsequent workpiece.

12. The machining center according to claim 11, wherein positioning of said tables on said machining areas is coordinated so that two tables never occupy two machining areas on which a same machining group can operate.

13. The machining center according to claim 1, wherein each of the number N of workpiece tables is independently movable.

14. The machining center according to claim 1, wherein each of the number N of workpiece tables is movable independent of movement of another one of the number N of workpiece tables.

15. A machining center, comprising:
   three or more workpiece tables, each of said at least three workpiece tables being located at a spaced location from each other;
   three or more first guides, each of said first guides extending parallel to a first direction, each of said workpiece tables being movable along one of said first guides;
   at least a plurality of second guides, each of said second guides extending parallel to a second direction, said second direction being transverse to said first direction;
   at least a plurality machining groups, each of said machining groups comprising at least one machining head, each of said machining groups being movable parallel to said second direction along one of said second guides;
   machining areas, wherein the machining groups are configured to machine the workpieces present on said workpiece tables in said machining areas, wherein a number of said machining areas are present along one of said first guides or for one of said tables, said number of said machining areas being equal to a number of said machining groups present along one of said first guides, wherein said machining groups are configured to operate, according to a programmed work cycle, on all of said workpiece tables;
   at least three workpiece loading/unloading areas.

16. The machining center according to claim 15, wherein the number of said machining groups present along said one of said first guides is equal to the number of said workpiece tables present along said one of said first guides minus one.

17. The machining center according to claim 15, wherein each of the number N of workpiece tables is independently movable.

18. The machining center according to claim 15, wherein each of the number N of workpiece tables is movable independent of movement of another one of the number N of workpiece tables.

19. A method for carrying out mechanical machining operations, the method comprising:
   providing a machining center according to claim 1, and for each table, the following steps:
   e) positioning in said unloading/loading area, to load at least one workpiece onto said table,
   f) translation from said unloading/loading area toward a said machining area and positioning in said machining area in which programmed machining operations can be carried out by a given machining group,
   g) translation toward another machining area along the corresponding first guide and positioning in said other machining area in which programmed machining operations can be carried out by another given machining group,
   f) if a further machining area distinct from the preceding machining areas on which the table has already been positioned is present, translation toward said further machining area and positioning in said further machining area in which programmed machining operations can be carried out by a further given machining group; this step d) being repeated iteratively until there are no more machining areas in which the table has not been positioned during the cycle,
   h) translation toward said loading/unloading area to unload the at least one machined workpiece and restart the cycle from step a).

20. The method for carrying out mechanical machining operations by means of a machining center, according to claim 19, wherein positioning of said tables on said machining areas is coordinated so that two tables never occupy two machining areas on which a same machining group can operate.

* * * * *